Nov. 6, 1928.
F. KUHN ET AL
1,690,415
ELECTRIC MELTING POT
Filed Jan. 30, 1928
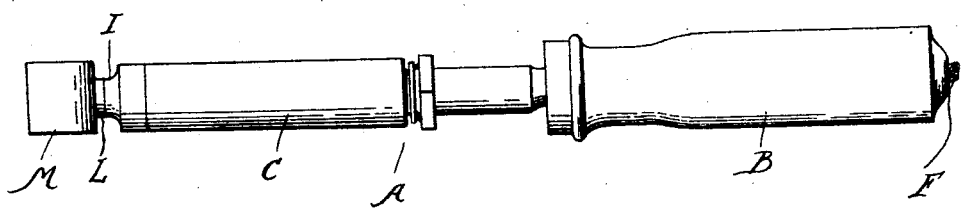
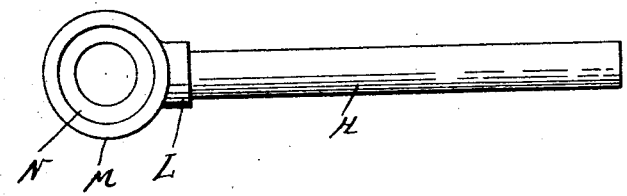
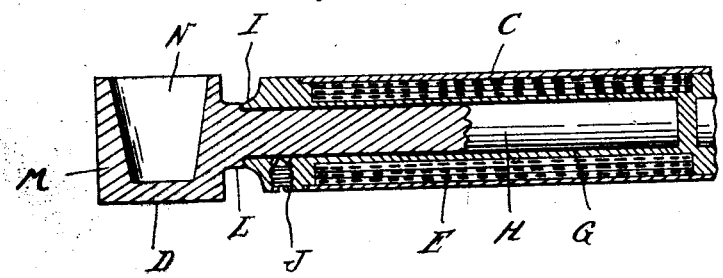
Inventors
Frank Kuhn
Laurence H. Thomas
Attorneys Patented Nov. 6, 1928.

1,690,415

UNITED STATES PATENT OFFICE.

FRANK KUHN AND LAURENCE H. THOMAS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRIC MELTING POT.

Application filed January 30, 1928. Serial No. 250,498.

The invention relates to electrically heated tools and more particularly to an improved construction of tip adapted to be used as an attachment for an electric soldering iron whereby the soldering iron may be converted into a device for melting solder and other metals.

The principal object of the invention is to provide a construction adapted to be used as a replacement unit for the tip of an ordinary electric soldering iron and be constructed in such a manner as to be effective in quickly melting the solder or other metal placed therein.

In the accompanying drawings

Figure 1 is an elevation of an electrically heated tool embodying our invention;

Figure 2 is a plan view of the tip;

Figure 3 is a longitudinal section through the tip.

Referring now to the drawings, A represents generally an electric soldering iron having a handle protion B, a casing C for the electrical resistor and a tip or tool D. The casing C is a hollow shell in which is arranged the cylindrical resistance element E, the terminals of which are conducted outwardly through the hollow handle B and are connected to an electric cord F. The cylindrical resistor E has an insulated cylindrical interior surface G which is adapted to surround the shank H of the tool. The shank projects outwardly through the collar I formed at the outer end of the casing C and is suitably secured to said casing, as for instance by the set screw J threadedly engaging the collar.

At the outer end of the shank H there is an enlarged portion L merging into the head M, which as shown is an enlarged cylindrical portion, the axis of which extends at right angles to the axis of the shank. The cylindrical head is provided with a recess N, which as shown extends substantially through the same and is inwardly tapered to a slight extent.

The tool as above described forms in effect a small melting pot and due to the small mass of the metal it can be quickly heated to the desired temperature by means of the same resistance that is normally employed for maintaining a soldering iron tip at the desired temperature. The tool is constructed of any suitable material, preferably of copper or bronz and it is preferable to have the head formed integrally with the shank portion. The advantage of the construction as above described is that the melting pot device may be used as a replacement for the ordinary soldering iron tip, thereby enabling the same soldering iron to be used either for its ordinary soldering purposes or for a melting pot. To convert the tool from one device to the other it is only necessary to loosen the set screw J and remove one shank by laterally withdrawing the same and to replace the other shank in the same position.

What we claim as our invention is:

1. An electrically heated tool comprising an outer casing, a cylindrical heating element therewithin, a shank slidably engaging said outer casing and insertable within said element, and an enlarged head at the outer end of said shank having a recess therein adapted for a melting pot.

2. An electrically heated tool comprising a hollow casing having an opening at one end thereof, a cylindrical heating element within said hollow casing, a cylindrical metallic shank within said heating element and projecting through said opening, and a metallic head integral with said shank having a recess therein extending transversely to the axis of said shank and forming a melting pot.

3. An electrically heated tool comprising an outer casing having a collar at one end, a heating element within said outer casing having a cylindrical opening therewithin, a cylindrical metallic shank within said heating element and projecting through said collar, an integral head at the outer end of said shank comprising a cylindrical portion arranged transversely to said shank and having a tapering recess therein and means for locking said shank to said collar.

4. An electrically heated tool comprising a tubular member, a heating element surrounding said tubular member, a cylindrical metallic shank insertable within said tubular member, an enlarged head integrally united to said stem at the outer end thereof and an annular shoulder on said head for engaging the end of said tubular member, said enlarged head having a recess therein with the axis transverse to the axis of said shank.

In testimony whereof we affix our signatures.

FRANK KUHN.
LAURENCE H. THOMAS.